United States Patent
Reddy et al.

(10) Patent No.: US 7,144,456 B2
(45) Date of Patent: Dec. 5, 2006

(54) CEMENTING COMPOSITIONS AND METHODS OF CEMENTING IN A SUBTERRANEAN FORMATION USING AN ADDITIVE FOR PREVENTING THE SEGREGATION OF LIGHTWEIGHT BEADS

(75) Inventors: B. Raghava Reddy, Duncan, OK (US); Sears T. Dealy, Comanche, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 59 days.

(21) Appl. No.: 11/001,442

(22) Filed: Dec. 1, 2004

(65) Prior Publication Data
US 2005/0076812 A1    Apr. 14, 2005

Related U.S. Application Data

(62) Division of application No. 10/376,388, filed on Feb. 28, 2003, now Pat. No. 6,889,767.

(51) Int. Cl.
*C04B 20/00* (2006.01)
*C04B 16/08* (2006.01)

(52) U.S. Cl. .................. 106/672; 106/676; 106/677; 106/681

(58) Field of Classification Search ............. 106/672, 106/676, 677, 681
See application file for complete search history.

(56) References Cited

U.S. PATENT DOCUMENTS

| | | | | |
|---|---|---|---|---|
| 2,857,286 A | * | 10/1958 | Striker ................. 106/728 |
| 3,804,058 A | * | 4/1974 | Messenger ............. 166/292 |
| 3,972,723 A | | 8/1976 | Balle et al. ............ 106/90 |
| 4,234,344 A | | 11/1980 | Tinsley et al. .......... 106/88 |
| 4,304,298 A | | 12/1981 | Sutton .................. 166/293 |
| 4,330,634 A | | 5/1982 | Rodaway ............... 521/65 |
| 4,340,427 A | | 7/1982 | Sutton .................. 106/87 |
| 4,367,093 A | | 1/1983 | Burkhalter et al. ...... 106/87 |
| 4,370,166 A | | 1/1983 | Powers et al. .......... 106/97 |
| 4,450,009 A | | 5/1984 | Childs et al. .......... 106/76 |
| 4,450,010 A | | 5/1984 | Burkhalter et al. ...... 106/87 |
| 4,676,317 A | | 6/1987 | Fry et al. .............. 166/293 |
| 4,700,780 A | | 10/1987 | Brothers ............... 166/293 |
| 4,703,801 A | | 11/1987 | Fry et al. .............. 166/293 |
| 4,806,164 A | | 2/1989 | Brothers ............... 106/90 |
| 5,124,186 A | | 6/1992 | Wycech ................. 428/35.8 |
| 5,837,739 A | | 11/1998 | Nowak et al. .......... 521/54 |
| 6,170,575 B1 | | 1/2001 | Reddy et al. ........... 166/293 |
| 6,245,142 B1 | | 6/2001 | Reddy et al. ........... 106/724 |
| 6,279,652 B1 | | 8/2001 | Chatterji et al. ........ 166/194 |
| 6,367,549 B1 | | 4/2002 | Chatterji et al. ........ 166/292 |
| 6,379,456 B1 | | 4/2002 | Heathman et al. ....... 106/724 |
| 6,457,524 B1 | | 10/2002 | Roddy ................. 166/293 |
| 6,478,869 B1 | | 11/2002 | Reddy et al. ........... 106/724 |
| 6,494,951 B1 | | 12/2002 | Reddy et al. ........... 106/705 |

FOREIGN PATENT DOCUMENTS

| | | |
|---|---|---|
| EP | 1 157 977 A1 | 11/2001 |
| JP | 165476 | 10/1993 |

OTHER PUBLICATIONS

Speciality Materials For the Oil & Gas Industry brochure dated Jun. 2001.
3M™ Microspheres brochure dated Sep. 2000.
3M Scotchlite™ Glass Bubbles brochure dated Jul. 1999.
Expancel brochure dated Jan. 2003.
Foreign communications from a related counterpart application, dated Sep. 2004.

* cited by examiner

*Primary Examiner*—Elizabeth D. Wood
(74) *Attorney, Agent, or Firm*—Craig W. Roddy; Conley, Rose, P.C.

(57) ABSTRACT

Cementing compositions and methods of cementing in a subterranean formation are provided. The cement composition includes a hydraulic cement, lightweight beads, and a desegregating agent for inhibiting segregation of the beads. The lightweight beads may be, for example, cenospheres, glass spheres, and ceramic spheres. The desegregating agent comprises a particulate substrate such as precipitated silica. It also comprises a polar molecule producing chemical disposed on the particulate substrate. Preferably, the polar molecule producing chemical is absorbed on the particulate substrate. The polar molecule producing chemical comprises at least one of a polar molecule producing acid such as glacial acetic acid, a salt of such an acid, and an acid anhydride. The method of cementing includes forming a pumpable slurry using the cement composition, pumping the slurry into a subterranean formation, and allowing the slurry to set.

15 Claims, No Drawings

CEMENTING COMPOSITIONS AND METHODS OF CEMENTING IN A SUBTERRANEAN FORMATION USING AN ADDITIVE FOR PREVENTING THE SEGREGATION OF LIGHTWEIGHT BEADS

CROSS-REFERENCE TO RELATED APPLICATIONS

This is a Divisional Application of U.S. patent application Ser. No. 10/376,388, filed Feb. 28, 2003, and now U.S. Pat. No. 6,889,767.

FIELD OF THE INVENTION

This invention generally relates to cementing compositions and methods of cementing in a subterranean formation. More specifically, the invention relates to methods of cementing in a subterranean formation using a cement composition comprising a desegregating agent for inhibiting the segregation of lightweight beads in the cement composition.

BACKGROUND OF THE INVENTION

Well cementing is a process used in penetrating subterranean formations to recover subterranean resources such as gas, oil, minerals, and water. In well cementing, a well bore is drilled while a drilling fluid is circulated through the well bore. The circulation of the drilling fluid is then terminated, and a string of pipe, e.g., casing, is run in the well bore. The drilling fluid in the well bore is conditioned by circulating it downwardly through the interior of the pipe and upwardly through the annulus, which is located between the exterior of the pipe and the walls of the well bore. Next, primary cementing is typically performed whereby a slurry of cement in water is placed in the annulus and permitted to set, i.e., harden into a solid mass, to thereby attach the string of pipe to the walls of the well bore and seal the annulus. Subsequent secondary cementing operations, i.e., any cementing operation after the primary cementing operation, may also be performed. One example of a secondary cementing operation is squeeze cementing whereby a cement slurry is forced under pressure to areas of lost integrity in the annulus to seal off those areas.

Low density or lightweight cement compositions are commonly used in wells that extend through weak subterranean formations to reduce the hydrostatic pressure exerted by the cement column on the weak formation. Conventional lightweight cement compositions are made by adding more water to reduce the slurry density. Other materials such as bentonite and sodium metasilicate may be added to prevent the solids in the slurry from separating when the water is added as described in, for example, U.S. Pat. No. 4,370,166. Unfortunately, the addition of more water typically increases the cure time and reduces the strength of the resulting cement.

Lightweight cement compositions containing lightweight beads have been developed as a better alternative to the cement compositions containing large quantities of water. The lightweight beads reduce the density of the cement composition such that less water is required to form the cement composition. The curing time of the cement composition is therefore reduced. Further, the resulting cement has superior mechanical properties as compared to cement formed by adding more water. For example, the tensile and compressive strengths of the cement are greater.

Unfortunately, a problem often encountered when using lightweight beads to lower the density of a cement composition is that the beads tend to segregate within the dry composition, and in particular during transportation due to agitation. For example, the lightweight beads may segregate together in one area of the cement composition, leaving other areas with little or no lightweight beads. Such segregation may be caused by a variation in the densities of the lightweight beads and/or by the lightweight beads having a density different from that of the cement. This segregation is particularly likely to occur when a gas stream is used to fluidize the cement composition for loading or unloading into a transport vessel. It is also particularly likely to occur when the lightweight beads are cenospheres, i.e., hollow sphere primarily comprising silica ($SiO_2$) and alumina ($Al_2O_3$). Cenospheres are a naturally occurring by-product of the burning process of a coal-fired power plant and thus have a wide range of sizes and densities. For example, cenospheres may vary in size from about 10 to about 350 micrometers (micron) and in specific gravity from about 0.3 to about 0.9.

Therefore, the density distribution of a dry cement composition containing lightweight beads typically becomes non-uniform during transport before the cement composition reaches its final destination, e.g., the site of a well bore. When a slurry is formed from the non-uniform cement composition and pumped into a well bore, the slurry most likely will not have a uniform density distribution. A cement column formed in the well bore using such a slurry also will most likely not have a uniform density distribution. As such, the design specifications of the density profile of the cement column will not be met. That is, the actual density profile of the cement column will be significantly different from the calculated density profile as determined by assuming the use of a homogenous composition. A need therefore exits to develop a way to eliminate the segregation of lightweight beads in a cement composition.

SUMMARY OF THE INVENTION

According to one embodiment, a cement composition includes a hydraulic cement, lightweight beads, and a desegregating agent for inhibiting segregation of the beads. The lightweight beads may be, for example, cenospheres, glass spheres, and ceramic spheres. The desegregating agent comprises a particulate substrate such as precipitated silica. It also comprises a polar molecule producing chemical disposed in the particulate porous substrate. Preferably, the polar molecule producing chemical is absorbed in the particulate porous substrate. The polar molecule producing chemical comprises at least one of a polar molecule producing acid such as glacial acetic acid, a salt of such an acid, and an acid anhydride.

According to another embodiment, a method of cementing in a subterranean formation includes forming the cement composition described above and forming a pumpable slurry using the cement composition. The method further includes pumping the slurry into a subterranean formation and allowing the slurry to set. The cement composition may be transported to a location proximate the subterranean formation before being formed into a pumpable slurry without experiencing segregation of the lightweight beads therein. As such, the cement column formed in the subterranean formation has a relatively uniform density distribution that meets design specifications.

DETAILED DESCRIPTION OF THE PREFERRED EMBODIMENTS

According to preferred embodiments, the foregoing cement composition contains cement, lightweight beads, and a desegregating agent for inhibiting segregation of the lightweight beads. A suitable cement includes hydraulic cement composed of calcium, aluminum, silicon, oxygen, and/or sulfur which sets and hardens by reaction with water. Examples of hydraulic cements are Portland cements, pozzolana cements, gypsum cements, high alumina content cements, silica cements, and high alkalinity cements. The cement is preferably a Portland cement, more preferably a class A, C, G, or H Portland cement, and most preferably a class G or A Portland cement.

As used herein, lightweight bead is defined as any particle added to the cement composition to lower its density, wherein the particle may be solid or hollow and is preferably a substantially hollow object filled with gas that is spherical or substantially spherical in shape. Preferred lightweight beads include cenospheres, glass spheres, ceramic spheres, and combinations thereof. The amount of lightweight beads in the cement composition may range from about 10% to about 150% by weight of the cement composition, depending on the desired density of the cement composition.

As used herein, desegregating agent is defined as an additive of a cement composition which inhibits segregation of the lightweight beads therein, particularly upon subjecting the cement composition to vibrations such as those experienced during transport of the cement composition. The desegregating agent comprises a polar molecule producing chemical disposed in a particulate porous substrate. In an embodiment, the polar molecule producing chemical is at least one of a polar molecule producing acid, a salt of such acid, and an acid anhydride. Examples of suitable polar molecule producing acids include, but are not limited to, organic acids such as acetic acid, an alkyl carboxylic acid, an alkene carboxylic acid, sulfonic acid, and combinations thereof. Salts of the foregoing acids may be formed using weak bases such as ammonia and amines. Examples of suitable acid anhydrides include, but are not limited to, sulfur dioxide, carbon dioxide, sulfur trioxide, nitrogen oxides, organic acid anhydrides, and combinations thereof. Any suitable particulate substrate for carrying the polar molecule producing acid may be used to form the desegregating agent provided that the substrate remains as a dry and free-flowing powder after absorbing the polar molecule producing chemical. The particulate substrate is preferably a porous material capable of absorbing the polar molecule producing chemical. Examples of such particulate substrates include, but are not limited to, precipitated silica, zeolite, talcum, diatomaceous earth, fuller's earth, and combinations thereof. A preferred desegregating agent contains glacial acetic acid absorbed onto precipitated silica.

The weight ratio of the particulate substrate to the polar molecule producing chemical utilized in the desegregating agent is preferably in a range of from about 90:10 to about 10:90, more preferably from about 75:25 to about 25:75. Further, the amount of the desegregating agent in the cement composition is preferably in the range of from about 0.01% to about 1.0% by weight of the cement, more preferably from about 0.02% to about 0.5% by weight of the cement, and most preferably from about 0.03% to about 0.2% by weight of the cement.

As deemed appropriate by one skilled in the art, additional additives may be introduced to the cement composition for improving or changing its properties. Examples of such additives include, but are not limited to, set retarders, fluid loss control additives, defoamers, dispersing agents, set accelerators, and formation conditioning agents. The additives can be pre-blended with the dry cement composition before the addition of a fluid thereto. Alternatively, the additives can be introduced to the cement composition concurrent with or after the addition of a fluid thereto.

According to preferred embodiments, a method of cementing in a subterranean formation comprises forming a cement composition comprising lightweight beads and a desegregating agent for inhibiting the segregation of the beads. The desegregating agent is formed by applying a polar molecule producing chemical to a particulate substrate having a relatively high porosity. A typical method of application of the polar molecule producing chemical is to add the chemical in the liquid form to the particulate substrate by spraying it on the substrate. The particulate substrate preferably absorbs the polar molecule producing chemical and thus remains in the form of a dry powder after the addition of the polar molecule producing chemical. Preferably, the desegregating agent is separately blended with a cement and with lightweight beads, followed by blending the cement/desegregating agent mixture and the lightweight beads/desegregating agent mixture together. Alternatively, the desegregating agent may be blended with a mixture already containing both the cement and the lightweight beads, it may be blended with the cement before adding the lightweight beads, or it may be blended with the lightweight beads before adding the cement. In this manner, a dry cement composition is formed.

The cement composition is then transported to a location near where a subterranean formation is to be cemented. The cement composition may be transported, e.g., in trucks travelling by road, in trains travelling by rail, or in barges travelling by sea. Whatever the method used to transport the cement composition, it most likely experiences much agitation/vibration during transport. Despite this agitation/vibration of the cement composition, the presence of the desegregating agent in the cement composition substantially inhibits the lightweight beads from segregating in different areas of the cement composition. Without intending to be limited by theory, it is believed that polar molecules produced by the desegregating agent react with the surfaces of cement particles and lightweight beads, thus changing the surface electric charges such that fluidization of the dry composition takes place. Thus, the distribution of the lightweight beads in the cement composition remains relatively constant throughout the movement of the composition to the location where the composition is to be used for a cementing operation.

An exemplary cementing operation for which the cement composition may be used is primary cementing. In particular, a well bore is drilled down to the subterranean zone while circulating a drilling fluid through the well bore. A string of pipe, e.g., casing, is then run in the well bore. The drilling fluid is conditioned by circulating it downwardly through the interior of the pipe and upwardly through the annulus. A sufficient amount of a fluid is added to the cement composition to form a pumpable slurry. The fluid is preferably fresh water or salt water, i.e., an unsaturated aqueous salt solution or a saturated aqueous salt solution such as brine or seawater. The slurry is displaced down through the pipe and up through the annulus. The slurry is then allowed to set or solidify into a hard mass, thereby forming a cement column or sheath in the annulus. The density distribution throughout the cement column is relatively uniform due to the presence of the desegregating agent. In alternative embodiments, the cement composition may be used for other cementing operations such as a secondary cementing operation.

EXAMPLES

The invention having been generally described, the following examples are given as particular embodiments of the invention and to demonstrate the practices and advantages hereof. It is understood that the examples are given by way of illustration and are not intended to limit the specification or the claims to follow in any manner.

Example 1

A cement composition was prepared by blending SPHERELITE beads with EZ-FLO desegregating agent, which contains acetic acid absorbed onto precipitated silica, followed by blending the resulting mixture with class G Portland cement. The SPHERELITE beads and the EZ-FLO desegregating agent are commercially available from Halliburton, Inc. The amount of EZ-FLO desegregating agent added to the composition was 0.13% by weight of the total composition. The blend contained 2 parts cement and 1 part SPHERELITE beads by weight. A target specific gravity of the cement composition based on design specifications was 1.73.

The cement composition was tested by placing 100 mL of the composition in a 100 mL graduated cylinder. The graduated cylinder containing the cement composition was then placed on a vibrator and vibrated for 20 seconds to form a packed cement column. The vibrator was an FMC Syntron Jogger, Model J-1 (115 volt/60 hertz/1 ampere) equipped with a PowerStat voltage regulator. The voltage applied was 20 volts. Samples from different parts of the packed cement column were collected. The specific gravities of a top portion and of a bottom portion of the cement column were then determined using a stereopycnometer manufactured by Quantachrome Corporation of Boynton Beach, Fla., USA. These specific gravities are presented below in Table 1.

Comparative Example 1

A conventional cement composition was prepared by blending 1 part of SPHERELITE beads with 2 parts of class G Portland cement. A target specific gravity of the cement composition based on design specifications was 1.73. The cement composition in this example was then tested in the same manner as the composition prepared in Example 1. The specific gravities of a top portion and of a bottom portion of the composition are shown below in Table 1. The overall specific gravity of the composition before subjecting it to vibration packing was also determined, as indicated in Table 1.

Example 2

A cement composition was prepared by blending SPHERELITE beads with EZ-FLO desegregating agent, followed by blending the resulting mixture with a mixture of Class G cement, calcium sulfate, SILICALITE fumed silica commercially available from Halliburton, Inc., and salt in a proprietary ratio. The amount of EZ-FLO desegregating agent added to the composition was 0.13% by weight of the cement and the SPHERELITE beads. A target specific gravity of the composition based on design specifications was 1.65. The cement composition in this example was then tested in the same manner as the composition prepared in Example 1.

Comparative Example 2

The cement composition described in Example 2 was prepared without treating the SPHERELITE beads with the EZ-FLO desegregating agent. A target specific gravity of the composition based on design specifications was 1.65. The cement composition in this example was then tested in the same manner as the composition prepared in Example 1. The specific gravities of a top portion and of a bottom portion of the composition are shown in Table 1. The overall specific gravity of the composition was also determined as indicated in Table 1.

Example 3

A cement composition was prepared by blending class G Portland cement with EZ-FLO desegregating agent (0.07% by weight of the cement) to form a first mixture, blending SPHERELITE beads with EZ-FLO desegregating agent (0.06% by weight of the beads) to form a second mixture, and blending the first and second mixtures together. A target specific gravity of the composition based on design specifications was 1.76. The cement composition in this example was then tested in the same manner as the composition prepared in Example 1. The specific gravities of a top portion and of a bottom portion of the composition are shown in Table 1.

TABLE 1

| Composition | Target Specific Gravity | Overall Specific Gravity of the Blend | Specific Gravity of the Top of the Blend | Specific Gravity of the Bottom of the Blend |
| --- | --- | --- | --- | --- |
| Comparative Example 1 | 1.73 | 1.73 | 1.78 | 1.68 |
| Example 1 | 1.73 | | 1.65 | 1.75 |
| Comparative Example 2 | 1.65 | 1.65 | 1.72 | 1.67 |
| Example 2 | 1.65 | | 1.60 | 1.70 |
| Example 3 | 1.76 | | 1.76 | 1.76 |

Based on the results shown in Table 1, adding EZ-FLO desegregating agent comprising acetic acid to the cement compositions containing lightweight beads made the specific gravity of the compositions more uniform from top to bottom. Example 3, which involved separately adding EZ-FLO desegregating agent to the cement and the lightweight beads before combining the two, yielded the most uniform cement composition.

While the preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claims.

Accordingly, the scope of protection is not limited by the description set out above, but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A dry cement composition comprising:
   a dry cement;
   lightweight beads; and
   a desegregating agent for inhibiting segregation of the beads in the dry cement;
   wherein the desegregating agent comprises a particulate substrate and a polar molecule producing chemical disposed on the particulate substrate.

2. The cement composition of claim 1 wherein the polar molecule producing chemical comprises at least one of a polar molecule producing acid, a salt of the polar molecule producing acid, and an acid anhydride.

3. The cement composition of claim 1 wherein the particulate substrate is selected from the group consisting of precipitated silica, zeolite, talcum, diatomaceous earth, fuller's earth, and combinations thereof.

4. The cement composition of claim 2 wherein the polar molecule producing acid is an organic acid.

5. The cement composition of claim 2 wherein the polar molecule producing acid is selected from the group consisting of an acetic acid, an alkyl carboxylic acid, an alkene caiboxylic acid, sulfonic acid, and combinations thereof.

6. The cement composition of claim 2 wherein the acid anhydride is selected from the group consisting of sulfur dioxide, carbon dioxide, sulfur trioxide, nitrogen oxide, carboxylic acid anhydride, and combinations thereof.

7. The cement composition of claim 1 wherein the polar molecule producing chemical is glacial acetic acid, and wherein the particulate substrate is precipitated silica.

8. The cement composition of claim 1 wherein the polar molecule producing chemical is absorbed on the particulate substrate.

9. The cement composition of claim 1 wherein the beads are selected from the group consisting of cenospheres, glass spheres, ceramic spheres, and combinations thereof.

10. The cement composition of claim 1 wherein a weight ratio of the particulate substrate to the polar molecule producing chemical ranges from about 90:10 to about 10:90.

11. The cement composition of claim 1 wherein a weight ratio of the particulate substrate to the polar molecule producing chemical ranges from about 75:25 to about 25:75.

12. The cement composition of claim 1 wherein an amount of the desegregating agent in the cement composition ranges from about 0.01% to about 1.0% by weight of the cement.

13. The cement composition of claim 1 wherein an amount of the desegregating agent in the cement composition ranges from about 0.02% to about 0.5% by weight of the cement.

14. The cement composition of claim 1 wherein an amount of the desegregating agent in the cement composition ranges from about 0.03% to about 0.2% by weight of the cement.

15. The cement composition of claim 1 further comprising an amount of water sufficient to form a pumpable slurry.

* * * * *